INVENTORS:
JAMES A. RAKESTRAW
NORMAN W. F. LEES
BY:
THEIR ATTORNEY

United States Patent Office 3,483,265
Patented Dec. 9, 1969

3,483,265
PRODUCTION OF DETERGENT ALKYLATE
James A. Rakestraw, Brentwood, and Norman W. F. Lees, South Benfleet, England, assignors to Shell Oil Company, New York, N.Y., a corporation of Delaware
Filed July 12, 1967, Ser. No. 652,844
Claims priority, application Great Britain, July 12, 1966, 31,282/66
Int. Cl. C07c *3/52, 15/04*
U.S. Cl. 260—671                                   1 Claim

ABSTRACT OF THE DISCLOSURE

Two-stage hydrofluoric acid-catalyzed alkylation of benzene hydrocarbons with monoolefins wherein the hydrocarbon reactants are contacted with only a portion of the total required catalyst in a first-stage and the balance of the required catalyst is thereafter added to the entire resulting initial reaction mixture in a second stage.

---

Figure 1:
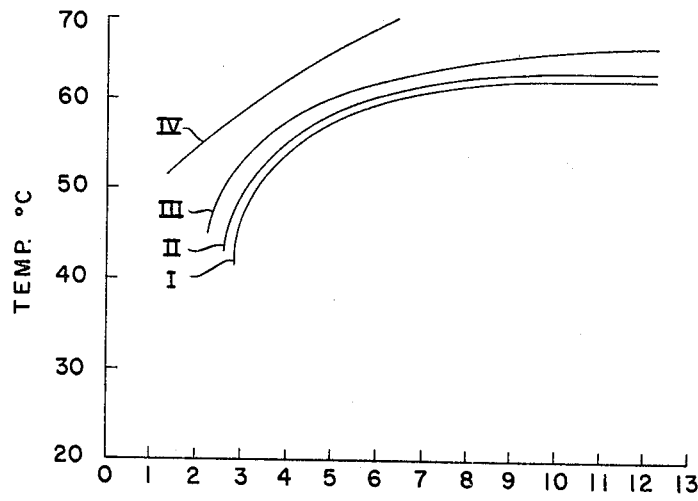

This invention relates to an improved process for the hydrofluoric acid-catalyzed alkylation of benzene hydrocarbons with straight-chain olefins producing detergent alkylate having a high content of terminal alkylbenzenes.

Detergent alkylate may be defined, for present purposes, as a monoalkylbenzene or a mixture of monoalkylbenzenes, suitable for being sulfonated. It is well known that monoalkylbenzene sulfonates are used on a large scale as detergents, or as the active components in detergent compositions.

It is known to prepare detergent alkylate from benzene and an olefin, or a mixture of olefins, with an acidic compound, or a mixture of acidic compounds, as the catalyst. Generally preferred are aluminum chloride and liquid acid alkylation catalysts, for instance aqueous sulfuric acid or hydrofluoric acid, the latter being particularly advantageous. By using hydrofluoric acid a detergent alkylate is obtained which may be readily purified. Two liquid phases, which may be called the hydrocarbon phase and the hydrofluoric acid phase, respectively, are present in the reaction zone. After the reaction they may be easily separated after stratification. The hydrofluoric acid phase, forming the lower layer, may then be discarded and/or recycled to the reaction zone and/or subjected to a regeneration treatment, while the hydrocarbon phase, forming the upper layer, is worked up to isolate the desired detergent alkylate.

Olefins used as alkylating agents in the manufacture of detergent alkylate normally have a number of carbon atoms within the range of from 8 to 18, and the alkyl groups formed from these olefins have, of course, the same numbers of carbon atoms.

As a rule relatively narrow fractions of olefins are employed for the production of detergent alkylate, as otherwise the reaction mixture may contain hydrocarbon components other than monoalkylbenzenes which cannot easily be separated by distillation from the desired alkylate. Of particular interest are fractions containing olefins which do not differ by more than 4 in the number of carbon atoms in their molecules, for instance a $C_{8-12}$ fraction, or, preferably, a $C_{8-10}$ fraction, if it is desired to prepare a liquid detergent composition, and a $C_{10-14}$ or a $C_{12-15}$ fraction, if it is desired to prepare a solid particulate product. In the latter case, it may, however, also be advantageous to mix two types of alkylates so as to obtain, for instance, a $C_{10-15}$ range of the alkyl groups.

Aryl alkanes, such as alkylbenzenes, intended for use as an intermediate product for the production of bio- degradable alkylbenzene sulfonates, have normally been synthesized in the manner that either a straight-chain monoolefin or a straight-chain paraffin monohalide is caused to react with an aromatic compound in the presence of an acid catalyst or a catalyst of the Friedel-Crafts type. Of these processes, two have been used on industrial scale; one utilizing the reaction of a straight-chain paraffin monochloride with benzene in the presence of aluminum chloride, and the other employing a reaction between straight-chain monoolefins and benzene in the presence of hydrogen fluoride.

Manufacturers of sulfonate detergents quite often demand a large content, for example at least 23 mole percent, preferably at least 25 mole percent, and most preferably at least 29 mole percent, of terminal monoalkylbenzenes. Herein monoalkylbenzenes in which the benzene nucleus is attached to a carbon atom, which occupies a terminal position or is adjacent to a terminal carbon atom, are called terminal alkylbenzenes. Monoalkylbenzenes in which the benzene nucleus is attached to a carbon atom which is neither terminal nor adjacent to a terminal carbon atom is herein called mid-chain alkylbenzenes. Now this commercial requirement can easily be met when using aluminum chloride as the catalyst. However, with hydrofluoric acid, which in other respects is by far to be preferred as the catalyst, poor yields of terminal alkylbenzenes were heretofore invariably obtained.

It is an object of the present invention to provide an improved hydrofluoric acid-catalyzed benzene alkylation process enabling the production of detergent alkylate having a high concentration of terminal alkylbenzenes with substantially complete maintenance of the advantages inherent in the use of hydrofluoric acid as the alkylation catalyst.

In accordance with the present invention, detergent alkylate having a high concentration of terminal alkylbenzenes is produced by reacting a benzene hydrocarbon with a straight-chain monoolefinic hydrocarbon of from six to twenty carbon atoms in a first reacton stage, in the presence of from about 0.1 to about 20% by weight of hydrogen fluoride and thereafter contacting the entire resulting reaction mixture under benzene alkylating conditions in a second reaction stage in the presence of an additional amount of hydrofluoric acid, and separating deteregnt alkylate having a high content of terminal alkylbenzenes from the effluence from the second reaction stage.

Figure 2:
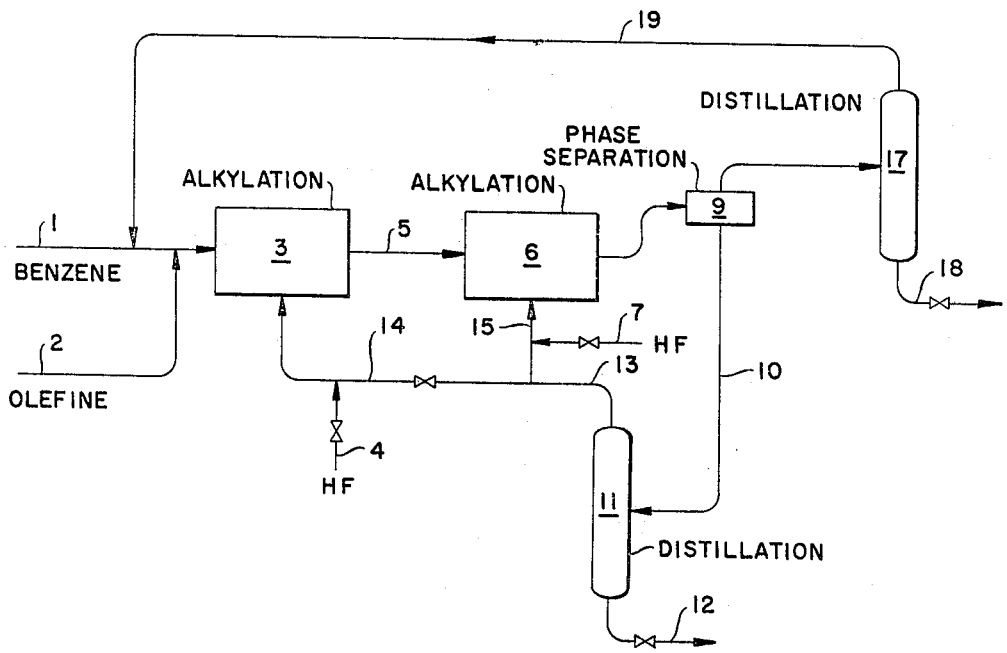

In the following description of the invention reference will be made to the attached drawing wherein FIGURE 1 is a graph illustrating relationship between temperature and catalyst concentration in the claimed process and FIGURE 2 is a diagrammatic illustration of one simplified form of apparatus suitable for carrying out the invention.

In the first reaction stage of the two-stage process the reactants are subjected to alkylation conditions which may be carried out under either high-temperature, vapor-phase conditions or liquid-phase, low-temperature conditions. When using high-temperature operating conditions, high temperatures, for instance of the order of 100 to 300° C., may be employed in the first reaction stage, provided a relatively large proportion of the total hydrofluoric acid to be used is already present, and residence times are kept low. Good results have, for instance, been obtained with a temperature of 160° C. and a residence time of approximately 0.1 second with 20% wt. of hydrofluoric acid in the reaction mixture. It is, however, preferred to carry out the first reaction stage in the liquid phase at temperatures in the range of from 35° C. to 85° C., preferably from 55° C. to 70° C., under a pressure which is at least sufficient for maintaining the liquid condition, for instance, pressures in the range of from 1 to 10 atm. a., preferably from 5 to 9 atm. a. Most suitable are, in general, temperatures in the range of from 60° to 65° C. In general, higher temperatures are required as the proportion of hydrofluoric acid is increased. This is brought out by FIGURE 1 of the accompanying drawing.

In FIGURE 1 the abscissae indicate percentage by weight of hydrofluoric acid present in the first-stage reaction mixture, and ordinates indicate temperature of the said reaction mixture in ° C. Curve I indicates the boundary between the regions in which less and more than 24 mole percent, respectively, of the alkylates obtained are terminal. Between curves I and II there is an increase from 24 to 25 mole percent; between curves II and III from 25 to 27 mole percent; between curves III and IV from 27 to 29 mole percent; in the region above curve IV the alkylates produced comprise more than 29 mole percent of terminal alkylates. It will be appreciated that the curves have been drawn on the basis of averages from a great number of experiments. Therefore, when the percentage of hydrofluoric acid and the temperature correspond with a point, say, on the 27 mole percent curve, that is curve III, the percentages of terminal alkylate in a variety of different runs may well be found to vary within the range of from 25 to 29 mole percent.

Preferred reaction time in the first reaction stage is dependent on the reaction temperature. With very high temperatures it is of the order of about 0.1 second. However, reaction times within the range of from 2 to 30 minutes are suitably employed with the preferred temperatures in the range of from about 35° to about 85° C. Residence time in the first reaction stage is as a rule found to be within the range of from about 20 to about 30 minutes.

Suitable percentages by weight of hydrofluoric acid in the first-stage reaction mixture are, in general, within the range of from about 0.1 up to about 20, but under the liquid-phase conditions at the defined relatively low temperatures, the upper limit is about 12.0% by weight. Preferred percentages by weight of hydrofluoric acid are then within the range of from 0.5 to 10, even more preferred percentages being within the range of from 1.0 to 6.0, and the most preferred percentages being within the range of from 2.5 to 5.0. Temperatures should be adapted to the percentages of hydrofluoric acid added, a temperature of the order of 100 to 300° C., for instance 160° C., being required with a proportion of hydrofluoric acid of the order of 20% wt. As regards liquid-phase operation with proportions of hydrofluoric acid up to 12% wt., reference may be made to FIGURE 1 of the attached drawings from which the minimum temperatures for obtaining a certain proportion of terminal alkylates in the final product are apparent.

Reaction temperatures in the second stage of the process of the invention are, preferably, within such a range that disintegration of olefins and/or of alkyl groups formed therefrom, and also polymerization of olefins, is avoided as far as it is possible. Optimal alkylation temperatures are generally within the range of from about 10° C. to about 70° C.

Pressures maintained in the second reaction stage should, preferably, be sufficient to prevent the formation of a gaseous phase at the temperature employed. There is no particular upper limit, but economically pressures substantially higher than required for maintaining a liquid condition, are undesirable. In general, the pressure will be within the range of from 1 to 10 atm. a., preferably from 5 to 9 atm. a.

Preferred residence times in the second reaction stage will vary depending to some extent on reaction temperature and olefin used as alkylating agent. Generally, residence times within the range of from about 15 to about 45 minutes are suitable.

In the second reaction stage most suitable percentages by weight of hydrofluoric acid with respect to the total reaction mixture are, in general, within the range of from 5 to 90, and preferably within the range of from 10 to 75, the most preferred percentages being within the range of from 20 to 60.

The invention may be carried out in batch, semi-continuous or continuous operation. It lends itself, however, with particular advantage to continuous operation.

Benzene and olefin may be introduced in widely varying molar ratios. An excess of benzene is generally preferred. Suitable ratios by weight of benzene to olefin in the charge are generally within the range of from 0.5:1 to 25:1, preferred ratios being within the range of from 1:1 to 10:1, most preferred within the range of from 3:1 to 4:1.

Benzene, the olefin, and the hydrofluoric acid may be separately or jointly injected into the first reaction stage, but, preferably, the hydrofluoric acid is not brought into contact with the olefin prior to injection into said stage, or at any rate only just prior to injection, because the hydrofluoric acid catalyzes polymerization of the olefin as well as the desired alkylation reaction. However, there is no objection to the combined injection of benzene and olefin or to the combined injection of benzene and hydrofluoric acid. As regards this last combination, it may be convenient to prepare a dispersion of the hydrofluoric acid in the benzene, and separately to introduce into the reaction zone this dispersion and the olefin. Preferably, the additional hydrofluoric acid is separately introduced into the second reaction zone, and not premixed with the effluent from the first reaction zone.

Detergent alkylate is separated from the effluence from the second reaction stage by conventional means comprising one or more such steps as stratification, distillation, extraction, etc. Unconverted reactants and hydrofluoric acid catalyst are recycled to the reaction. When a hydrofluoric acid phase is separated from a hydrocarbon phase after the second-stage reaction, this may be recycled to the first or, especially, the second reaction stage. It is, however, preferred to introduce into both stages only hydrofluoric acid which is substantially pure and has a water content of less than 3% wt., most preferably less than 1% wt. Hydrofluoric acid from a regeneration zone may partly or entirely be re-used, fresh hydrofluoric acid being added to make up the total amount required, provided the regeneration is such as to yield hydrofluoric acid of the desired degree of purity, and to prevent a gradual build-up of contaminants, including water. It has been found that a regeneration meeting these requirements can, in general, be achieved by a simple distillation process in which only a minor proportion of the hydrofluoric acid, i.e. less than 1%, usually between 0.1 and 0.5%, is not distilled overhead but goes into the bottom product, no doubt substantially completely in a chemically bound condition, for instance in the form of alkyl fluorides.

Without intent to limit the scope of the invention by theory advanced herein to define more clearly the invention, it is believed that when there is a relatively large proportion of hydrofluoric acid, the olefins tend to dissolve in the hydrofluoric acid phase under addition of protons thereto so that carbonium ions are formed. Although the positive charge is not to a substantial extent carried by terminal atoms of the carbon chains, for the rest the distribution is substantially equal. This means that with a chain of twelve carbons, to take an example, approxmiately twenty per cent of the carbonium ions may have the charge on carbon atoms adjacent to terminal carbon atoms. When these carbonium ions react with benzene in such a manner that the benzene nucleus is attached to the chain at the place of the positive charge, the result will be that approximately 20% of the dodecylbenzenes formed are terminal, and approximately 80% are of the mid-chain type.

However, when there is a low proportion of hydrofluoric acid with respect to hydrocarbons, the rate of carbonium ion formation may be reduced to such an extent that another reaction, which has such a low rate that is generally negligible as compared with carbonium ion formation, now has a chance to proceed sufficiently far to influence the outcome of the alkylation process. It may be assumed that in the hydrocarbon phase olefins react with hydrofluoric acid dissolved therein with the formation of alkyl fluorides or in any case addition products, in which a fluorine atom is linked, although possibly not by means of a normal chemical bond, to a particular carbon atom of the chain. Using the term fluoroalkane in a broad sense so as also to cover addition products, it may be assumed that there is a marked preference for the formation of 2-fluoroalkanes, and that the inverse reaction by which olefins and free HF are formed the 2-fluoroalkanes proceeds negligibly slowly, even if later on there is a higher proportion of hydrofluoric acid to hydrocarbons in the reaction zone, since benzene reacts comparatively rapidly with the 2-fluoroalkanes to form 2-phenylalkanes. This gives a full explanation of the increased yield of terminal alkylbenzenes or, more specifically, of 2-phenylalkanes.

The invention will further be illustrated by the following examples which should not, however, be interpreted in a limitative sense. It will be evident to those skilled in the art that the teachings which they convey allow of large variations with regard to features of secondary importance.

EXAMPLE I

Using equipment substantially as diagrammatically represented by FIGURE 2 of the accompanying drawing, benzene was continuously alkylated with hydrofluoric acid as the catalyst.

In the system of FIGURE 2, benezene is fed to a first reaction zone 3 by way of line 1, and the olefin charge by way of line 2. The recycle stream of benzene comprising a small proportion of recovered hydrofluoric acid is injected into line 1 by way of line 19. By way of line 4 fresh hydrofluoric acid is introduced into line 14 by which regenerated hydrofluoric acid is recycled to the first reaction zone 3. From the first reaction zone 3 the reaction mixture is passed by way of line 5 to the second reaction zone 6. Regenerated hydrofluoric acid is introduced into the second reaction zone 6 by way of line 15. Fresh hydrofluoric acid may be injected into line 15 from line 7 to make up the total amount required. The mixture leaving the second reaction zone 6 is passed by way of line 8 to settler 9. The upper hydrocarbon layer is passed from settler 9 by way of line 16 to flash column 17, from which unconverted benzene containing hydrofluoric acid, and, possibly, also a small proportion of intermediates, is recycled to feed line 1 by way of line 19. The remaining liquid, now free from hydrofluoric acid, consisting of alkylbenzenes having a high concentration of terminal alkylbenzenes, may then be worked up in conventional equipment not shown in the figure. It may, for instance, be distilled to remove remaining unconverted benzene, and intermediates, and to separate the desired detergent alkylate from a residue containing heavy alkylation products.

The lower hydrofluoric acid layer is passed from settler 9 by way of line 10 to a regeneration column, distillation column 11. In column 11 the hydrofluoric acid is distilled off, and acid-soluble oil is withdrawn as bottoms by way of line 12. The distillate, consisting of substantially pure hydrofluoric acid is passed through line 13 to lines 14 and 15 which lead to the reaction zones 3 and 6, respectively.

The benzene freshly introduced into the system was of nitration grade. The hydrofluoric acid freshly introduced into the system was substantially pure, and contained approximately 0.5% wt. of water.

The same mixture of olefins was employed as charge in three runs discussed below. It was derived from slack wax and had the following properties:

| | |
|---|---|
| Distillation range, ° C. | 185–240 |
| Bromine number | 90 |
| Maleic diene value | 15 |
| Refractive index, $n_D^{20}$ | 1.4453 |
| Specific gravity, 15/15° C. | 0.7937 |
| Mean molecular weight | 168 |
| Mole percent cyclic compounds including aromatic compounds | 5 |
| Mole percent aromatic compounds | 2 |
| Mole percent paraffins | 10 |
| Mole percent straight-chain olefins | 80 |

The bromine number indicates the number of grams of bromine consumed by 100 g. of the sample tested as determined by means of ASTM Method D1159–64 (see the "1965 Book of Standards," published by the American Society for Testing and Materials, Philadelphia, January 1965, Part 17, pages 501–502).

The maleic diene value gives a measure for the conjugated diene content. It was determined according to ASTM Method D1961 (see the "1965 Book of Standards," Part 20, pages 888–890). The distillation range was determined using ASTM Method D86–62 ("1965 Book of Standards," Part 17, pages 8–20).

Two runs, Runs I and II, were made in relatively small-scale experimental equipment without provision for continuous recirculation of regenerated hydrogen fluoride, although HF-containing benzene was flashed off and recycled. This recycle stream did not contain any intermediates and consisted of 98% wt. of benzene and 2% wt. of hydrofluoric acid. According, nearly all of the hydrofluoric acid introduced into the reaction zones was fresh from the supply of pure hydrofluoric acid containing 0.5% wt. of water. However, the hydrofluoric acid from the two stratification zones was collected and neutralized, so as to recover the total amount of acid-soluble oil formed. The first-stage reaction was carried out without stirring, but there was a vigorous circulation in the second stage to promote mixing of the two liquid phases.

A third run, Run III, was made in larger equipment with provision for continuously recirculating regenerated hydrofluoric acid as well as HF-containing benzene in complete accordance with the drawing. The recycle stream from the flash column consisted of 90% wt. of benzene, 8% wt. of intermediates, and 2% wt. of hydrofluoric acid. There was mixing by circulation in a loop in both reaction stages.

The following table shows the reaction conditions for the three runs.

| Run No. | I | II | III |
|---|---|---|---|
| Benzene introduced, kg./hr | 3.0 | 2.5 | 4.0×10³ |
| Olefins introduced, kg./hr | 7.0 | 7.0 | 9.0×10³ |
| Detergent alkylate produced, kg./hr | 7.75 | 5.7 | 10.8×10³ |
| First stage: | | | |
| Benzene in hydrocarbon feed, percent | 75 | 75 | 79 |
| HF in reaction mixture, percent wt | 2.5 | 3.0 | 4.3 |
| Temperature, °C | 60 | 60 | 60 |
| Mean residence time, minutes | 20 | 20 | 28 |
| Second stage: | | | |
| HF in reaction mixture, percent wt | 25 | 25 | 20 |
| Temperature, °C | 47 | 52 | 49 |
| Mean residence time, minutes | 20 | 28 | 25 |
| Terminal alkylate content of purified product, percent wt | 30 | 29 | 27 |
| Duration of run | 2 weeks | 5 days | 5 days |

EXAMPLE II

Using the same equipment as in Run III of the preceding example, benzene was alkylated with a mixture of olefins as characterized in the following table.

Proportions with different numbers of carbon atoms, mole percent:

| | |
|---|---|
| $C_{10}$ | 13 |
| $C_{11}$ | 26 |
| $C_{12}$ | 25 |
| $C_{13}$ | 24 |
| $C_{14}$ | 12 |
| Distillation range, °C. | 183–240 |
| Bromine number | 84 |
| Maleic diene value | 6.0 |
| Refractive index, $n_D^{20}$ | 1.4358 |
| Specific gravity, 15/15° C. | 0.771 |
| Mean molecular weight | 166 |

Three runs were carried out. Run I was in accordance with the present invention; Runs II and III are given for comparison to show the beneficial effect of the invention in raising the proportiton of terminal alkylate.

The following table shows the reaction conditions for the three runs.

| Run No. | I | II | III |
|---|---|---|---|
| Molar ratio of benzene to olefins in feed | 11.1 | 11.3 | 11.3 |
| Olefins introduced, metric tons/day | 207 | 207 | 207 |
| Detergent alkylate produced, metric tons/day | 213 | 234 | 218 |
| First stage: | | | |
| HF in reaction mixture, percent wt | 3.7 | 14 | 13 |
| Temperature, °C | 64 | 55 | 64 |
| Mean residence time, minutes | 21 | 18 | 18 |
| Second stage: | | | |
| HF in reaction mixture, percent wt | 14 | 14 | 13 |
| Temperature, °C | 63 | 54 | 63 |
| Mean residence time, minutes | 9 | 9 | 9 |
| Terminal alkylate content of purified product, percent wt | 30 | 21 | 21 |
| Duration of run | 2 days | 3 days | 2 days |

Detergent alkylates of the present invention were sulfonated in a conventional manner using sulfur trioxide as the sulfonating agent. The sulfonation product was worked up, also in a conventional manner, to prepare the sodium sulfonates. Conventional detergent compositions were made using sulfonates of the invention. All such compositions were successfully employed in usual washing and cleaning operations.

We claim as our invention:

1. The process for the production of detergent alkylate having a content of terminal alkylbenzene of at least 23 mole percent which consists essentially of reacting a benzene hydrocarbon with a straight chain monoolefinic hydrocarbon of 6 to 20 carbon atoms, at vapor-phase benzene alkylating conditions of temperature in the range of from about 100 to about 300° C., in the presence of from about 0.1 to about 20% by weight of hydrofluoric acid in a first reaction stage, thereafter adding an additional amount of concentrated hydrofluoric acid to the total resulting reaction mixture to obtain a mixture having a higher hydrofluoric acid content than that maintained in said first reaction stage in the range of from about 5 to about 90% by weight, subjecting said mixture having said higher hydrofluoric acid content to further benzene alkylating condition of temperature in the range of from about 10 to about 70° C. in a second reaction stage, and separating alkylate having a high terminal alkylbenzene content from the products obtained in said second reaction stage.

References Cited

UNITED STATES PATENTS

| | | | |
|---|---|---|---|
| 2,559,818 | 10/1951 | Hanmer | 260—671 |
| 2,740,807 | 4/1956 | Rappen et al. | 260—671 |
| 3,355,508 | 11/1967 | Moulden | 260—671 |

DELBERT E. GANTZ, Primary Examiner

C. R. DAVIS, Assistant Examiner